United States Patent [19]
Louis et al.

[11] Patent Number: 6,088,023
[45] Date of Patent: Jul. 11, 2000

[54] INTEGRATED POINTING AND DRAWING GRAPHICS SYSTEM FOR COMPUTERS

[75] Inventors: William M. Louis; Constance M. Louis, both of Encinitas, Calif.

[73] Assignee: Willow Design, Inc., Encinitas, Calif.

[21] Appl. No.: 08/763,095

[22] Filed: Dec. 10, 1996

[51] Int. Cl.[7] .................................................. G09G 5/00
[52] U.S. Cl. ......................................... 345/173; 345/157
[58] Field of Search .................................... 345/173, 174, 345/175, 176, 177, 184, 156, 157, 160, 158; 341/22, 32, 33, 34

[56] References Cited

U.S. PATENT DOCUMENTS

| | | | |
|---|---|---|---|
| Re. 35,342 | 10/1996 | Louis et al. | 345/179 |
| 3,524,998 | 8/1970 | Gilbert | 307/299 |
| 3,657,475 | 4/1972 | Peronneau et al. | 178/18 |
| 4,121,049 | 10/1978 | Roeber | 178/18 |
| 4,340,777 | 7/1982 | Decosta et al. | 178/18 |
| 4,355,202 | 10/1982 | Decosta et al. | 178/18 |
| 4,389,711 | 6/1983 | Hotta et al. | 364/556 |
| 4,550,384 | 10/1985 | Kimura | 364/556 |
| 4,675,569 | 6/1987 | Bowman et al. | 310/328 |
| 4,697,049 | 9/1987 | Peemöller et al. | 178/18 |
| 4,736,191 | 4/1988 | Matzke et al. | 340/365 |
| 4,771,276 | 9/1988 | Parks | 340/712 |
| 4,831,359 | 5/1989 | Newell | 341/5 |
| 4,886,943 | 12/1989 | Suzuki et al. | 178/18 |
| 4,918,262 | 4/1990 | Flowers et al. | 178/18 |
| 4,980,518 | 12/1990 | Kobayashi et al. | 178/18 |
| 4,983,786 | 1/1991 | Stevens et al. | 178/18 |
| 5,012,230 | 4/1991 | Yasuda | 340/706 |
| 5,019,677 | 5/1991 | Menen | 178/18 |
| 5,038,142 | 8/1991 | Flowers et al. | 341/34 |
| 5,231,386 | 7/1993 | Brandenburg et al. | 340/709 |
| 5,250,930 | 10/1993 | Yoshida et al. | 345/168 |
| 5,287,121 | 2/1994 | Louis et al. | 345/179 |
| 5,327,161 | 7/1994 | Logan et al. | 345/157 |
| 5,327,164 | 7/1994 | Fagard et al. | 345/174 |
| 5,453,758 | 9/1995 | Sato | 345/158 |
| 5,508,719 | 4/1996 | Gervais | 345/157 |
| 5,515,044 | 5/1996 | Glatt | 341/22 |
| 5,541,622 | 7/1996 | Engle et al. | 345/161 |

FOREIGN PATENT DOCUMENTS

| | | |
|---|---|---|
| 58-213387 | 12/1983 | Japan . |
| 60-222920 | 7/1985 | Japan . |
| 60-43733 | 8/1985 | Japan . |

*Primary Examiner*—Dennis-Doon Chow

[57] ABSTRACT

An integrated graphic tablet/touchpad can be toggled between an absolute (graphic tablet) input mode and a relative (touchpad) input mode. In the relative mode, a graphics window appears on an associated display only when pressure is exerted on an input surface, and a cursor can be moved by stroking the input surface. In contrast, in the absolute mode the window is always displayed, and the cursor is relocated to a new position in the window each time a stylus or finger is moved onto the input surface. A graphic tablet armrest bridge is also disclosed, as is a one-piece stick-on device that converts a portion of the area of a position sensitive cursor control input device into a cursor control area having cursor control characteristics that are different than those of the remainder of the input device.

8 Claims, 10 Drawing Sheets

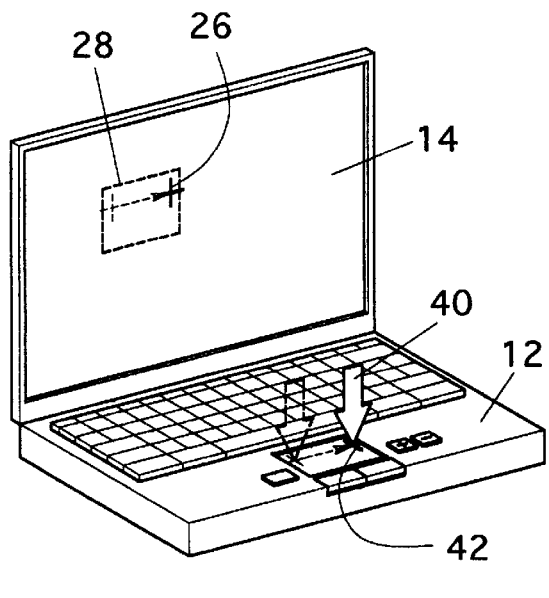
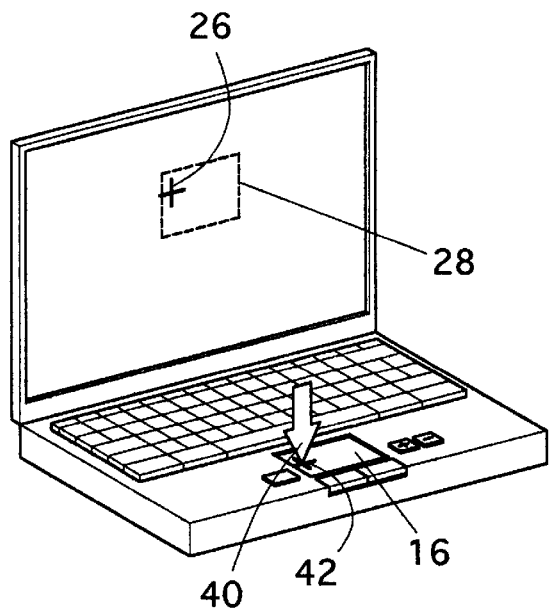
FIG. 3A  FIG. 3B
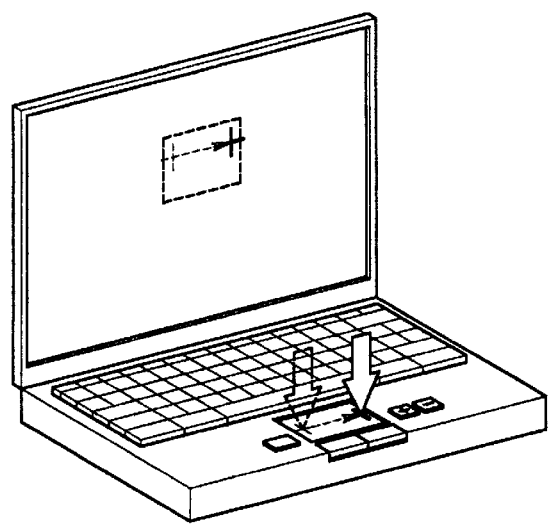
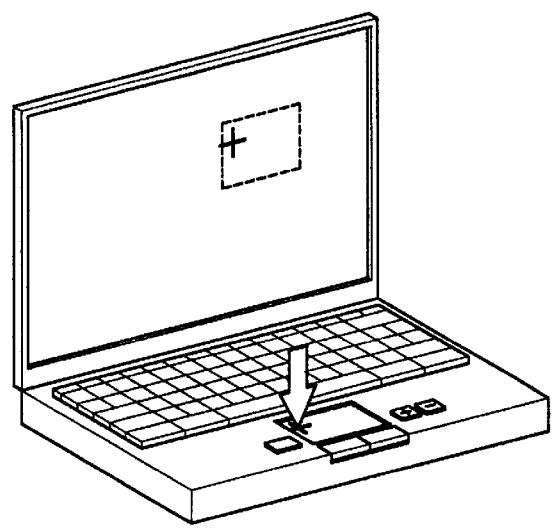
FIG. 3C  FIG. 3D

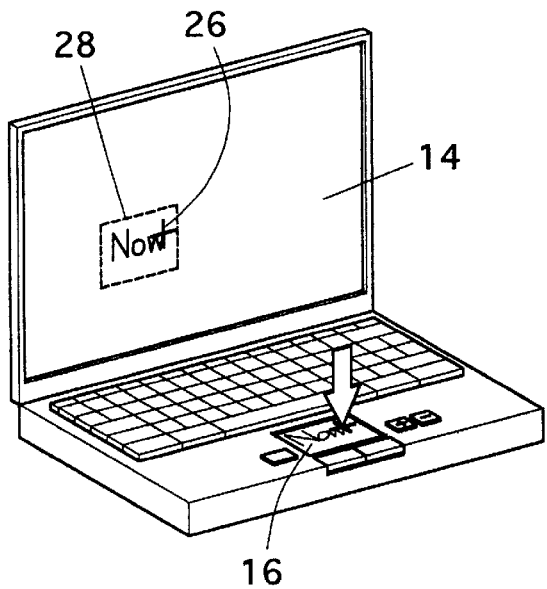
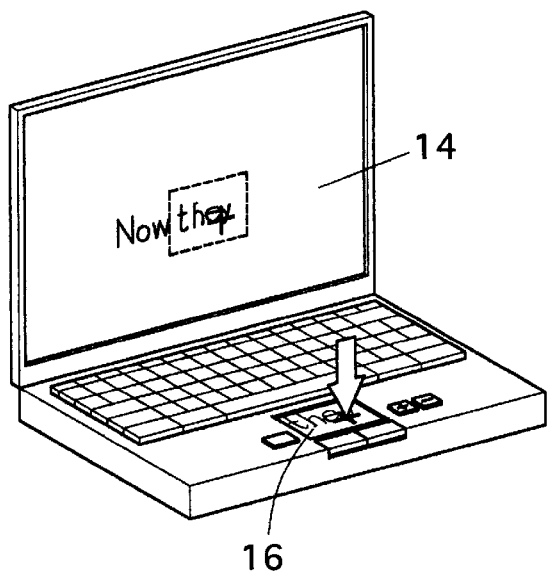
FIG. 4A                FIG. 4B
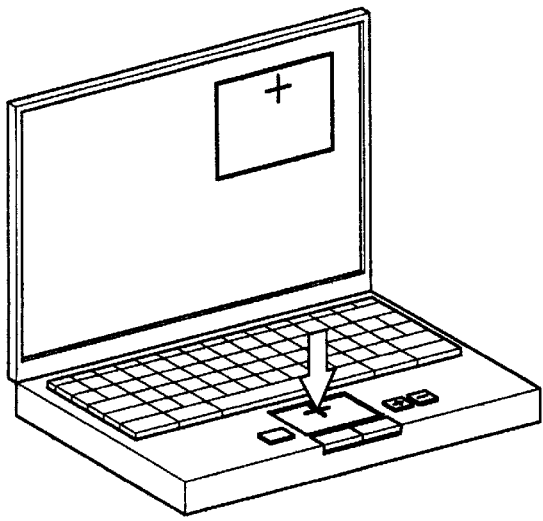
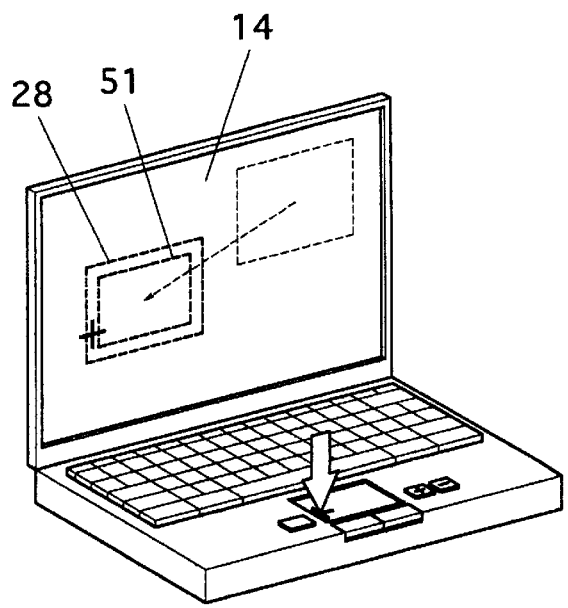
FIG. 4C                FIG. 4D

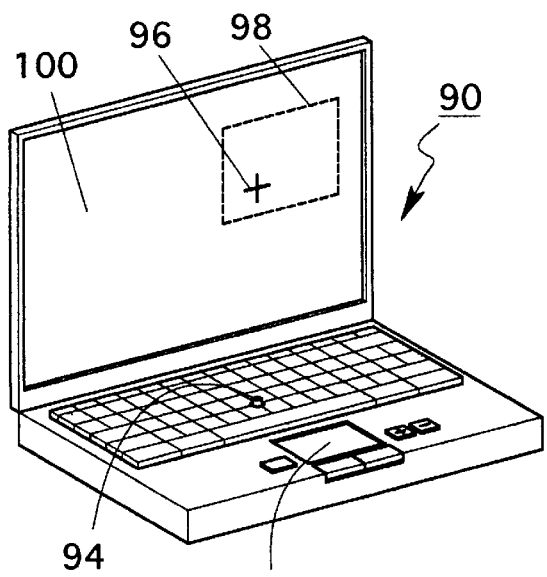
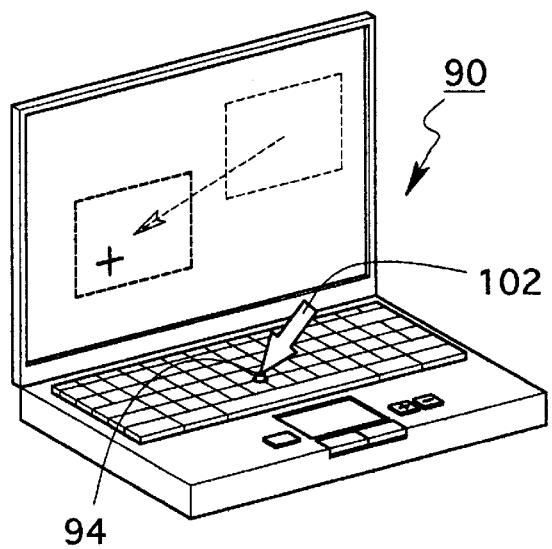
FIG. 6A          FIG. 6B
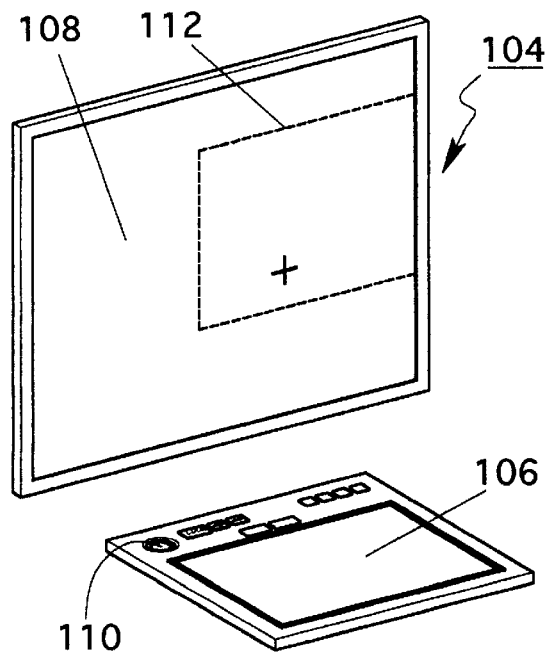
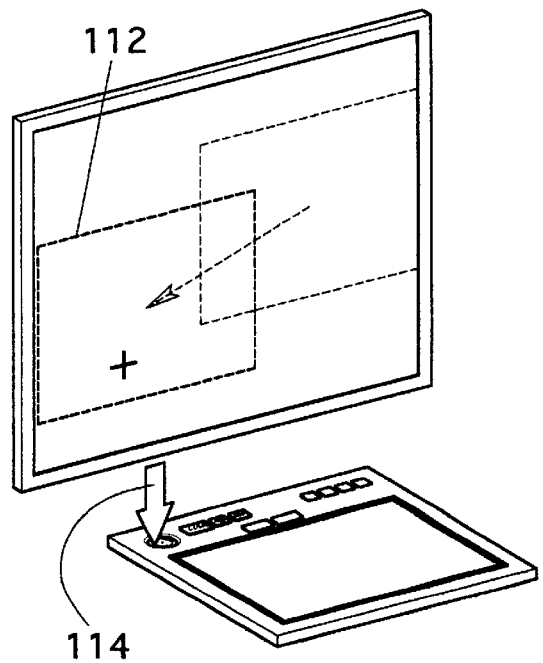
FIG. 7A          FIG. 7B

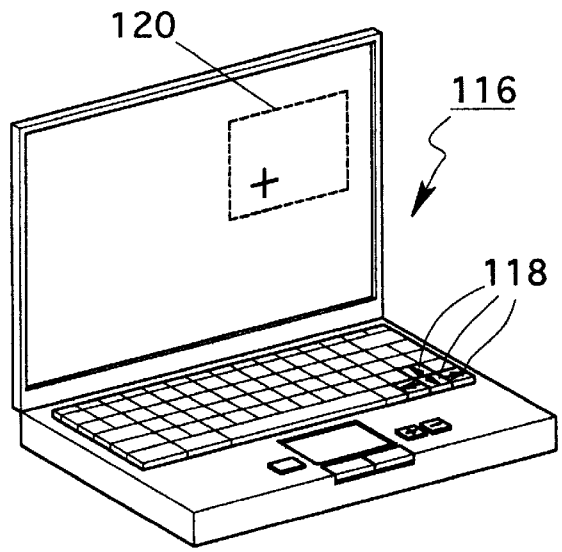
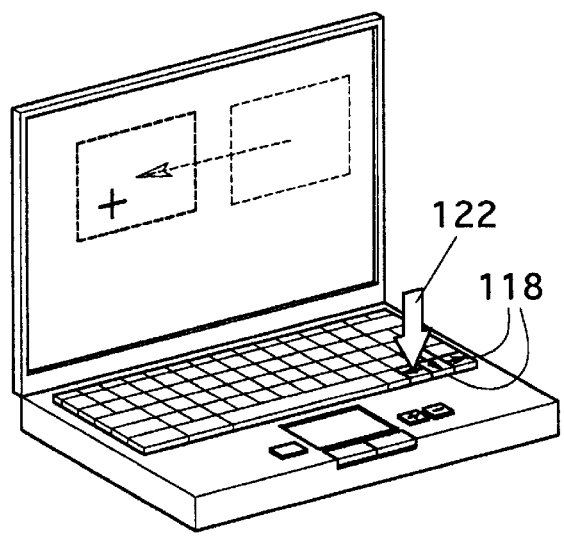
FIG. 8A
FIG. 8B
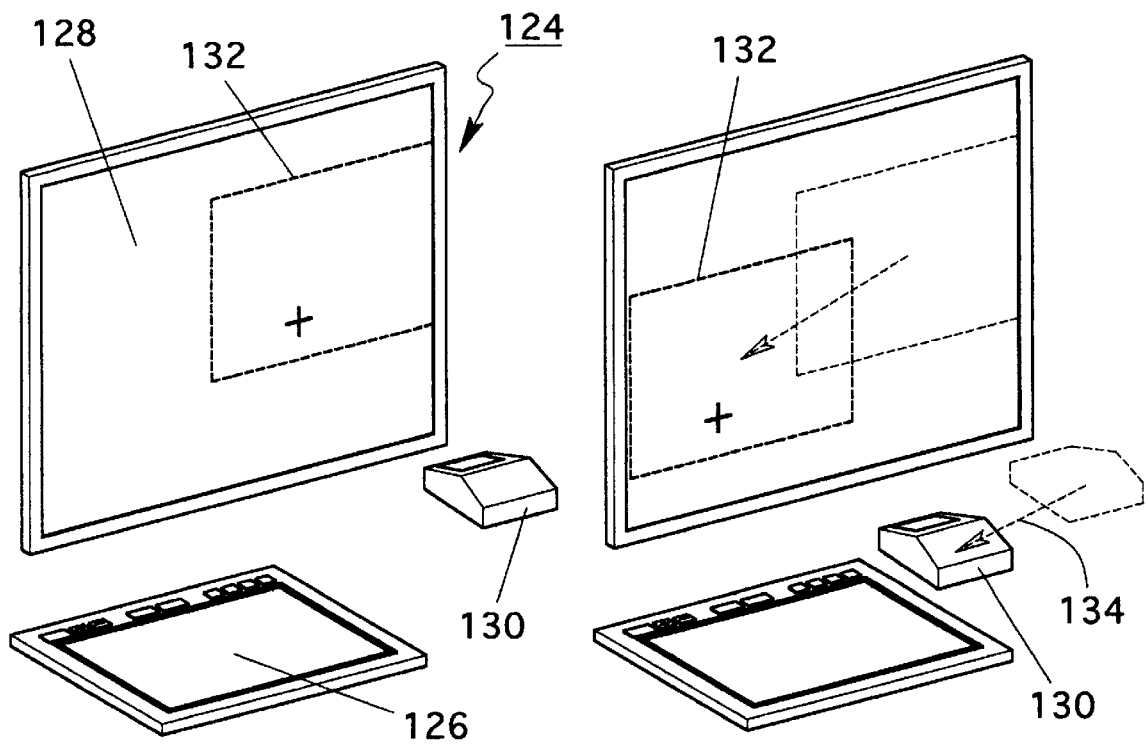
FIG. 9A
FIG. 9B

6,088,023

INTEGRATED POINTING AND DRAWING GRAPHICS SYSTEM FOR COMPUTERS

FIELD OF THE INVENTION

The present invention relates generally to graphical user interfaces, and more particularly to graphic tablets and touchpads.

BACKGROUND

Touchpads and graphic tablets are graphics input devices that cause data to be input to a computer display in response to stimulation of a position sensitive surface. Such stimulation can be tactilely generated, wherein a pressure sensitive surface is physically contacted by a user's finger or stylus. Or, the position sensitive surface might sense the presence of a stylus that is in close proximity to, but that does not physically touch, the surface. Accordingly, for purposes of the present invention "position sensitive surface" means both surfaces that are tactilely stimulated and surfaces that are stimulated by the close proximity of a contact object, such as a stylus.

In the case of touchpads, a user can control the positioning of a cursor on a display by pressing against the touchpad and moving the user's finger. Typically, the touchpad is part of the same physical assembly as is the display. When a user lifts the finger from the touchpad and then places it back down on the pad, the position of the cursor on the display is not relocated, but remains in its position on the display until the finger moves. In this sense, a touchpad can be thought of as a relative input device, much like a mouse. Indeed, touchpads are used to undertake the functions traditionally undertaken by mice.

On the other hand, graphic tablets are remote from their associated displays, and are absolute input devices, in that once an input stylus (used to exert pressure against or otherwise stimulate the tablet) is lifted from the tablet and then placed back down onto the tablet, the cursor is instantaneously relocated to a new position on the display. In effect, the input area defined by the tablet is mapped absolutely to the display. With this combination of structure, graphic tablets are rendered suitable for drawing objects on a display (and converting drawing strokes to electronic signals).

As recognized by the present invention, while each of touchpads and graphic tablets are effective for their intended purpose, combining the functions in a single device would be advantageous for several reasons. First, the versatility of such a device obviates the need for two separate devices. Also, the size of the graphics window can be established as appropriate for rapid cursor control or for high-resolution graphics input. Moreover, by switching between functions, the present invention recognizes that certain drawbacks inherent in graphic tablets can be overcome, such as unintended lines or contour discontinuities being input as a result of lifting and then once again pressing a stylus onto the input surface.

As still further recognized herein, however, such switching between relative (touchpad) input modes and absolute (graphic tablet) input modes should be easy, and should not distract the user's attention from the display. In other words, the present invention recognizes that it would be advantageous to provide visual feedback that is clearly representative of the invoked mode. Moreover, the present invention recognizes a need to easily convert existing touchpads and graphic tablets into dual-purpose input devices.

In addition to the above considerations, the present invention recognizes that a user of a pressure-sensitive graphic tablet might occasionally unintentionally input data via the tablet when the user's arm is rested on the tablet during data input with a stylus. Furthermore, the present invention recognizes a need to provide a simple, inexpensive device for converting a portion of a cursor control input device into a cursor control area having cursor control characteristics that are different from those of the remainder of the input device.

Accordingly, it is an object of the present invention to provide a system and method for establishing a graphics input device having both a relative input mode and an absolute input mode. Another object of the present invention is to provide a system and method for establishing a graphics input device having both a relative input mode and an absolute input mode, which provides visual feedback that represents the particular mode which is invoked. Still another object of the present invention is to provide a system and method for establishing a graphics input device having both a relative input mode and an absolute input mode that is easy to use and cost-effective. Another object of the present invention is to provide a device which permits a user of a graphic tablet to rest his or her arm without unintentionally inputting data. And, a further object herein is to provide a simple, one-piece stick-on device which cooperates with software for converting a portion of a position sensitive input device to a cursor control area having characteristics that are different from those of the remainder of the input device.

SUMMARY OF THE INVENTION

A computer program product includes a computer program storage device that is readable by a digital processing system and a program means on the program storage device. As intended by the present invention, the program device is realized in a critical machine component that causes the digital processing system to perform method steps to present a graphics window on a display which is associated with the digital processing system. An input surface is in data communication with the digital processing system for inputting data to the digital processing system when a contact element stimulates the input surface, and the method steps which are executed by the digital processing system include receiving a toggle signal that is representative of an absolute mode or a relative mode. Also, the method steps include, when the toggle signal represents an absolute mode, presenting a window on the display regardless of whether the contact element stimulates the input surface. In the absolute mode, an image of a cursor is generated in the window at a position relative to the window that is analogous to the position of the contact element relative to the input surface. Moreover, the method steps include, when the toggle signal represents a relative mode, presenting a window on the display only when a contact element stimulates the input surface. In the relative mode, an image of a cursor is generated in the window at a position relative to the window that is analogous to the position of the contact element relative to the input surface.

In the preferred embodiment, the presenting steps include displaying a window having the same shape as the input surface. Also, the method steps further preferably include relocating the window when in the relative mode and relocating the cursor when in the absolute mode. In the presently preferred implementation, the window defines a periphery and the input surface defines a periphery, and the moving step includes defining a border within the periphery of the input surface. Also, the moving step includes presenting an image of the border within the periphery of the window. Per the present invention, the window is caused to move when the contact element stimulates the input surface between the periphery of the input surface and the border. Still further, the moving step includes moving the window when the contact element moves over the input surface at a speed greater than a predetermined speed. If desired, the window can be enlarged or shrunk in size.

The computer program product is also disclosed in combination with the digital processing apparatus, and in further combination with a toggle key. Also, a computerimplemented method for executing the above steps is disclosed.

In another aspect, a system for alternatively establishing a graphic tablet and a touchpad includes a display and a position sensitive input surface associated with the display. Also, the system includes logic means for receiving an absolute signal and a relative signal, and graphic tablet logic means for establishing a graphic tablet in response to the absolute signal. In accordance with the present invention, the graphic tablet logic means presents a graphics window on the display regardless of whether the input surface is stimulated. Further, the graphic tablet logic means presents a cursor at a location in the graphics window that is analogous to the location of a position point on the input surface. Moreover, the system includes touchpad logic means for establishing a touchpad in response to the relative signal, with the touchpad logic means presenting a graphics window on the display only when the input surface is stimulated at a position point on the input surface. The touchpad logic means further presents a cursor at a location in the graphics window that is analogous to the location of the position point on the input surface.

In another aspect, a computer program product includes a computer program storage device which is readable by a digital processing system. Logic means are on the program storage device, and the logic means include instructions which are executable by the digital processing system for performing method steps for controlling a cursor on a display associated with the digital processing system based on signals received from a pressure sensitive input surface. These method steps include receiving calibration signals from the input surface, and, in response to the calibration signals, defining at least a click zone and a velocity zone. Then, in response to subsequent signals from the click zone and the velocity zone, click signals and cursor motion signals are respectively returned.

In yet another aspect, a device includes a unitary flexible plastic body defining a central tactile element, a velocity ring element centered on the tactile element, and a transition plate between the tactile element and the velocity ring element. The central tactile element, transition plate, and velocity ring element respectively correspond to a click zone, a transition zone, and a velocity ring, with the body including an adhesive surface for adhering the body to a pressure sensitive input surface.

In still another aspect, a device includes a graphics input substrate and a frame holding the substrate, with the frame defining opposed side edges. A bridge is slidably engaged with the frame along the side edges. Per present principles, the bridge is spaced from the substrate such that a person can rest a portion of his or her arm on the bridge while inputting tactile signals on the substrate.

The details of the present invention, both as to its structure and operation, can best be understood in reference to the accompanying drawings, in which like reference numerals refer to like parts, and in which:

BRIEF DESCRIPTION OF THE DRAWINGS

FIGS. 3A–3D are perspective views of the graphics input device in the relative mode, showing a sequence of events caused by repeatedly stroking a finger across the input surface;

FIGS. 4A and 4B are perspective views of the graphics input device in the relative mode, showing a sequence of handwriting input events;

FIG. 4C is a perspective view of the graphics input device in the relative mode, showing an alternate graphics window representation;

FIG. 4D is a perspective view of the graphics input device in the relative mode, showing a border against which a finger can be pressed to move the graphics window;

FIGS. 6A and 6B show an alternate input device that uses a joystick;

FIGS. 7A and 7B show yet another alternate input device that uses a built-in trackball;

FIGS. 8A and 8B show still another alternate input device that uses cursor control arrows;

FIGS. 9A and 9B show yet another alternate input device that uses a mouse;

DETAILED DESCRIPTION OF THE PREFERRED EMBODIMENT

Figures 1A, 1B:
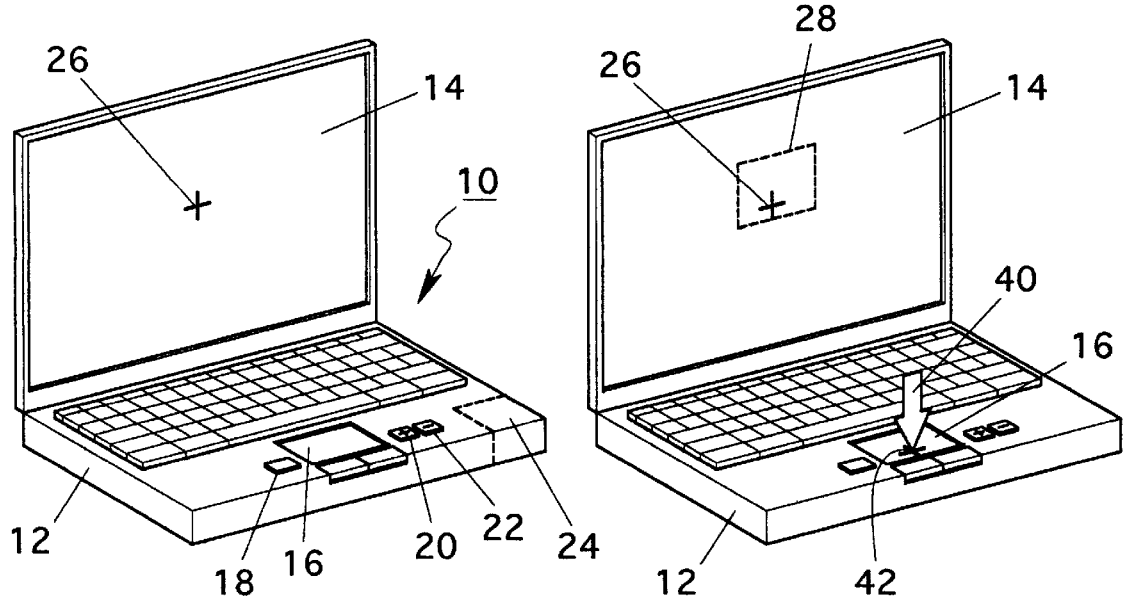
FIG. 1A is a perspective view of the graphics input device of the present invention shown integrated with a laptop computer, in the relative mode with no pressure on the input surface.
FIG. 1B is a perspective view as shown in FIG. 1A, in the relative mode with pressure being exerted on the input surface.

Referring initially to FIG. 1A, a graphics data entry system is shown, generally designated 10. In the embodiment shown, the system 10 includes a digital processing apparatus 12 configured as a laptop computer having a flat panel display 14 and a position sensitive input surface 16. The input surface 16 is a pressure-sensitive and/or position sensitive system that can employ, e.g., semiconductive sensing, capacitive sensing, electrostatic sensing, membrane sensing, electromagnetic sensing, and resistive sensing. Also, the system 10 includes a mode select toggle switch 18, a window size increase button 20, and a window size decrease button 22. Moreover, the system 10 includes a software-implemented data input device driver 24, schematically shown in phantom in FIG. 1A.

As disclosed below, the movement of a cursor 26 is controlled by the device driver 24 in response to data input signals input tactilely by a user by means of the input surface 16. Also, a graphics window 28 (FIG. 1B) can be made to appear on the display 14 by the device driver 24. In accordance with the present invention, the graphics window 28 has the same shape as the input surface 16. Stated differently, the graphics window 28 preferably has the same configuration as the input surface 16 and the graphics window 28 is proportional to the input surface 26, although the size of the graphics window 28 can be the same as or different from the size of the input surface 16. If desired, however, the shape of the window 28 can be changed, along with its size.

It is to be understood that with the exception of the switch 18, buttons 20, 22, and software-implemented driver 24, the apparatus 12 is in all essential respects a conventional laptop computer having a touchpad data entry surface. It is to be further understood that alternatively, the switch 18 and buttons 20, 22 can be omitted and the functions of the switch 18 and buttons 20, 22 undertaken by three conventional computer keyboard function keys that have been appropriately defined by the device driver 24 as, respectively, a mode select switch and window size increase and decrease buttons. Indeed, the device driver 24 can be incorporated into other digital processing apparatus such as conventional graphic tablets and touchpads to render such digital processing apparatus as the system 10.

Figure 2:
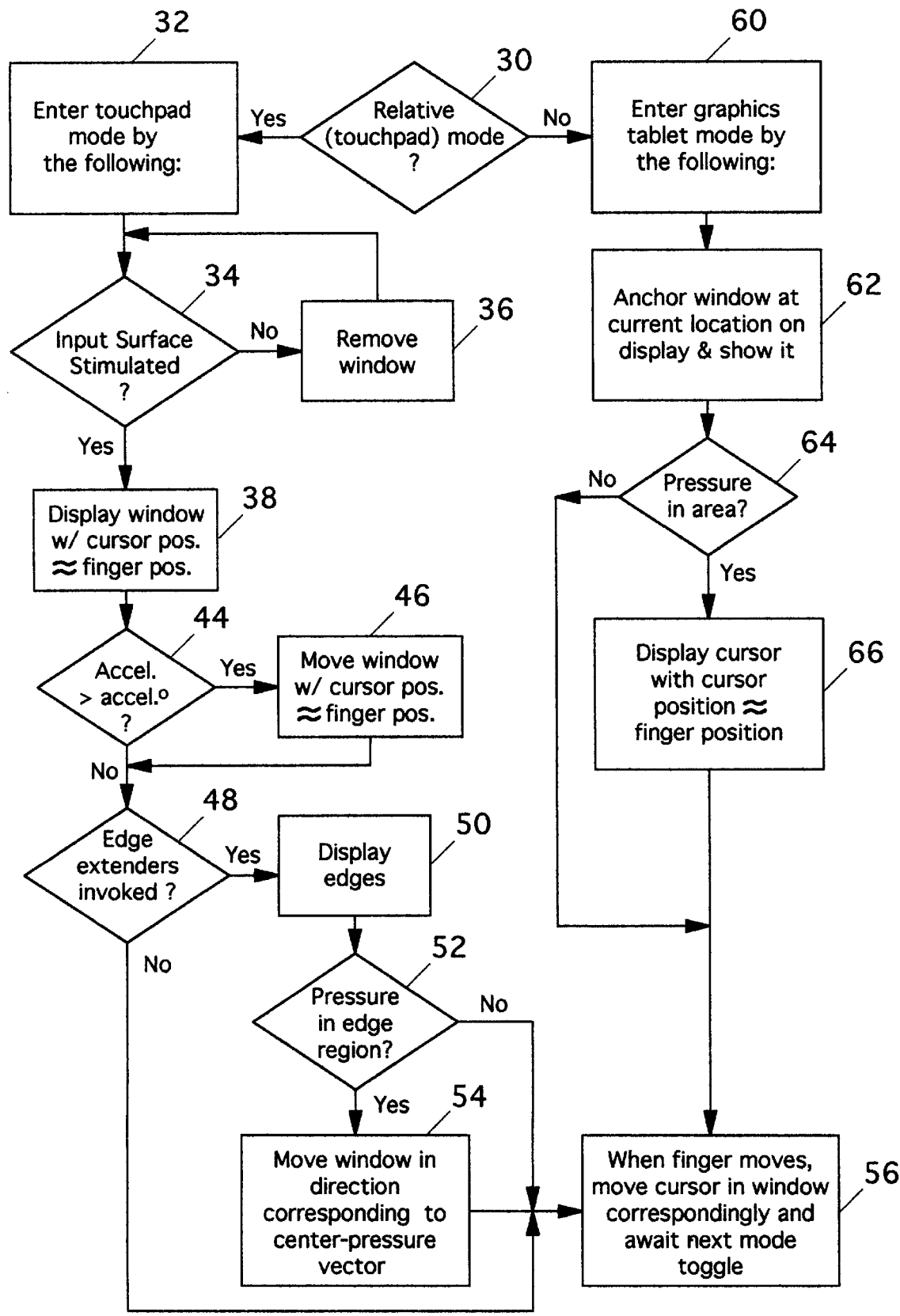
FIG. 2 is a flow chart showing the logic of the present invention.

FIG. 2 illustrates the structure of the device driver 24 of the present invention as embodied in computer program software. Those skilled in the art will appreciate that the Figures illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown in the Figures.

These instructions may reside on a program storage device including a data storage medium to establish a computer program product, such as a programmed computer diskette. Alternatively, such media can also be found in semiconductor devices, on magnetic tape, on optical disks, on a DASD array, on a conventional hard disk drive, on electronic read-only memory or on electronic random access memory, or other appropriate data storage device associated with the server computer 12. In an illustrative embodiment of the invention, the logic means are computer-executable instructions that are written in C++ code.

Referring now to FIG. 2, at decision diamond 30 the driver 24 determines whether a relative (touchpad) mode has been selected. In accordance with the presently preferred embodiment, the relative mode is the default mode, and an absolute (graphic tablet) mode can be selected either by holding down the mode select switch 18 (FIG. 1A) or by toggling the switch 18 twice in rapid succession to lock the system 10 in the absolute mode. A subsequent single toggle of the switch 18 releases the absolute mode lock and returns the system 10 to the relative mode.

When the system 10 is in the relative mode, the logic moves to block 32 to operate in the relative (touchpad) mode as follows. At decision diamond 34, it is determined whether the input surface 16 is being stimulated (e.g., by a user's finger, stylus, or some other contact element touching the surface 16). If not, no graphics window is displayed, or if a graphics window had been displayed, it is removed at block 36. FIG. 1A shows the appearance of the display 14 after block 36.

In contrast, if it is determined that stimulation is being exerted on the input surface 16, the logic proceeds to block 38 to display the window 28 as shown in FIG. 1B. More specifically, at a time (referred to herein as "touch time") at which a contact element (indicated by a down arrow 40 in FIG. 1B) is moved against a position point 42 on the input surface from a position distanced from the input surface 16, the graphics window is caused to appear on the display in a geometric relationship to the cursor 26 that is the same as the geometric relationship between the position point 42 and the input surface 16.

Proceeding to decision diamond 44, the logic determines whether the acceleration or velocity of the contact element across the input surface 16 exceeds a predetermined threshold, denoted as "$acc_o$" in FIG. 2. If it does, the logic proceeds to block 46 to move the graphics window 28 with cursor 26 inside using a motion vector that is proportional to a function of the speed and direction of the contact element motion on the input surface 16. Thus, by "move" is meant the continuous motion of an object, such as a cursor or graphics window, across the display 14. In contrast, "relocate" means the instantaneous jump-like relocation of an object on the display 14. It is to be understood that when the window 28 is moved at block 46, the position of the cursor 26 within the window 28 keeps its proper relationship as defined by the position of the contact element on the input surface 16.

From block 46 or from decision diamond 44 if the test there was negative, the logic moves to decision diamond 48 to determine whether the user has invoked edge extenders on the input surface 16, also referred to herein as "borders". Such an invocation can be made during driver 24 set up. If the borders have been invoked, in brief cross-reference to FIGS. 2 and 4D the logic moves to block 50 to display an image 51 of the borders. In other words, if a border has been defined within the periphery of the input surface 16, an image 51 of the border is presented within the periphery of the window 28 at block 50.

Continuing to decision diamond 52, the logic determines whether stimulation of the border region of the input surface 16 has been effected. If so, the logic moves to block 54 to move the graphics window 28 in the direction corresponding to the vector defined between the position point 42 and the center of the input surface 16. From block 54, or from decision diamonds 48 or 52 if the tests there were negative, the logic moves to block 56. At block 56, the logic causes the cursor 26 to move with a vector that is proportional to the motion vector of the contact element across the input surface 16.

Figures 1C, 1D:
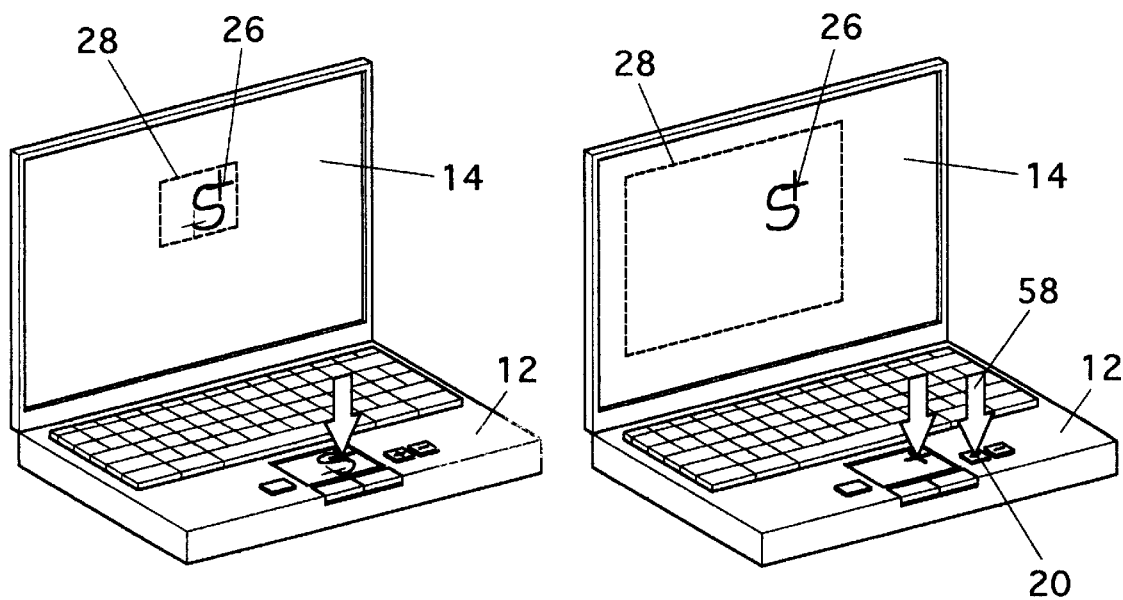
FIG. 1C is a perspective view as shown in FIG. 1B, showing the result of finger motion on the input surface.
FIG. 1D is a perspective view as shown in FIG. 1C, showing how the graphics window can be enlarged.

With this disclosure in mind, it can now be appreciated that at block 56 in the relative mode, in response to a user drawing an imaginary "S" on the input surface 16, the driver 24 causes the display 14 to present an "S" in a location in the graphics window 28 that corresponds to the location on the input surface 16 at which the user traced the "S", as shown in FIG. 1C. If desired, the size of the window 28 can be enlarged (but the shape not changed), as shown in FIG. 1D, by pressing the window size increase button 20, as indicated by the arrow 58. As those skilled in the art will recognize, the size of the window 28 can be decreased by pressing the window size decrease button 22.

Additionally, in the relative mode the input surface 16 can be stroked to move the cursor 26 across the display 14, as shown in FIGS. 3A–3D. More specifically, when a contact element 40 is positioned at an initial position (shown in phantom in FIG. 3A) on the left side of the input surface 16, the cursor 26 is positioned at an analogous position (shown in phantom) in the window 28. Then, when the contact element is moved to an end position near the right side of the input surface 16 (shown in solid in FIG. 3A), the cursor 26 correspondingly moves in the window 28.

Next, the contact element can be lifted away from the input surface 16, causing the window 28 to disappear, but causing the cursor to remain on the display 14. Then, the contact element can again be positioned on the left side of the input surface 16 as shown in FIG. 3B. This does not cause the cursor 26 to move, but it does cause the window to reappear such that the cursor 26 appears at a location in the window 28 that is analogous to the location of the position point 42 on the contact surface 16, as discussed previously. Thus, the window 28, in the relative mode, appears to "jump", i.e., to relocate, to a new position, when the contact element is lifted from the input surface 16 and then once again pressed against the surface 16. The effect on the display 14 of subsequent left-to-right strokes on the input surface 16 are shown in FIGS. 3C and 3D.

Still further, FIGS. 4A and 4B show that the window 28 can be moved as described above in reference to FIGS. 3A–3D to enable a user to cause successive text to be displayed on the display 14, such as the words "now" and "they". As shown, the words do not move when the window 28 is repositioned, but rather they remain anchored at their original positions on the display 14. FIG. 4C shows that if desired, the periphery of the window 28 can be solid instead of dashed lines. It is to be understood that the periphery can alternatively be "moving ants", dots, and so on.

Referring back to FIG. 2, if it is determined at decision diamond 30 that the absolute mode has been entered, the driver 24 enters the absolute mode at block 60 by moving to block 62 to anchor the window 28 at its current location on the display 14. In the absolute mode, the window 28 is displayed regardless of whether the input surface 16 is being stimulated.

At decision diamond 62, it is determined whether the input surface 16 has been stimulated. If so, the process moves to block 66 to display the cursor at a location in the graphics window that is analogous to the location of the position point on the input surface. Thus, in the absolute mode the effect of lifting the contact element away from a position point and then pressing the contact element against the input surface at a new position point is to cause the cursor to "jump", i.e., to relocate, to a new, corresponding position in the graphics window. From block 66 or decision diamond 64 when the test there is negative, the process moves to block 56.

The absolute mode of the present invention can be appreciated in reference to FIGS. 5A–5D. A graphic tablet display 70 (i.e., a display that is electrically connected to but physically remote from its associated input surface) presents images of a cursor 72 inside a window 74. The absolute mode has been invoked by constant pressure against a mode select switch 76, as indicated by the arrow 78 in FIG. 5A. An input surface 80 is electrically connected to the display 70 to function as described above. It is to be understood that while FIGS. 5A–5D show a system that incorporates a graphic tablet configuration instead of a laptop computer configuration, both it and the system 10 function substantially identically in both the relative and absolute modes.

Figure 5A:
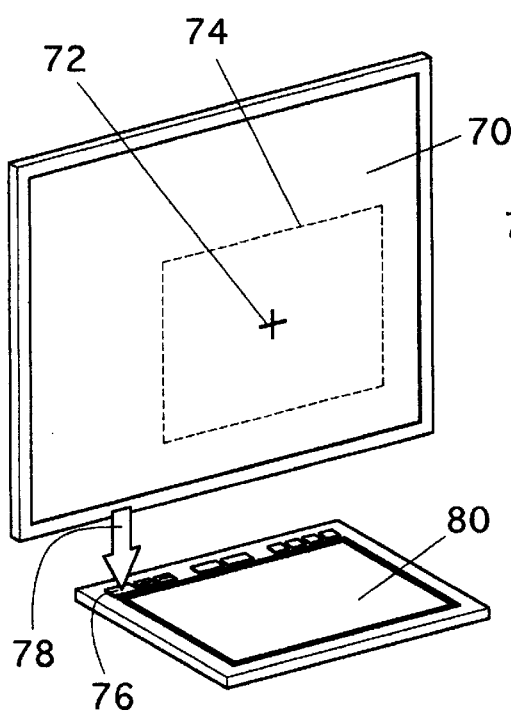
FIGS. 5A–5D are perspective views of an alternate embodiment of the graphics input device in the absolute mode, showing a sequence of events in the absolute mode, with periodic toggling to the relative mode.
Figure 5B:
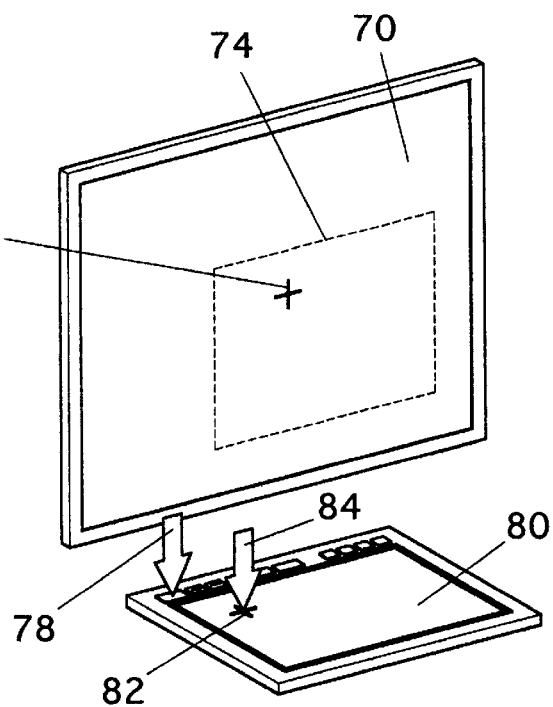

FIG. 5B shows that when stimulation is applied to a position point 82 by a contact element 84, the cursor 72 is instantaneously relocated (i.e., it "jumps") to a new location in the window 28 that is analogous to the location of the position point 82 on the input surface 80. The window 74, however, does not move in the absolute mode, unless, as described below, the system includes an additional pointing device (not shown in FIGS. 5A and 5B) that can be used to move the window.

Figure 5C:
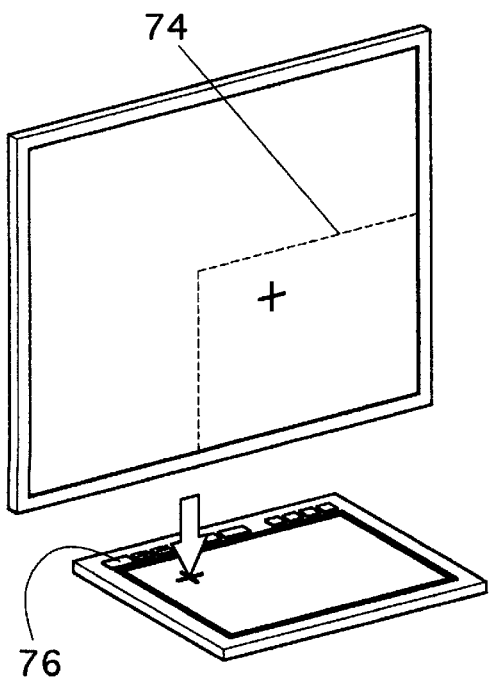
Figure 5D:
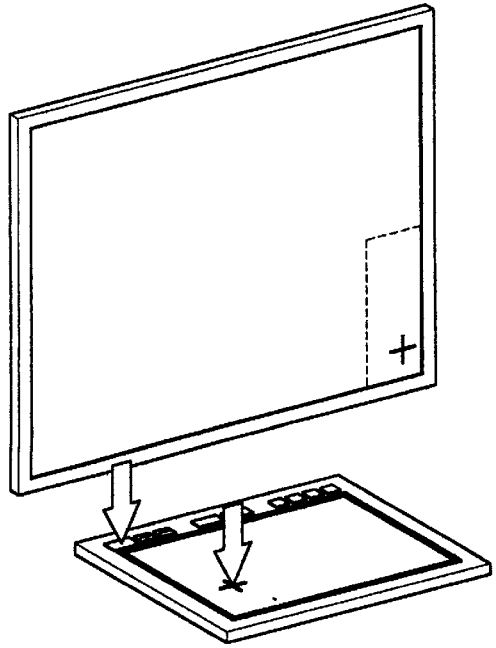

FIGS. 5C and 5D show that the relative mode can be reentered by releasing the mode select switch 76. Then the window 74 can be moved as described above. As shown in FIG. 5D, when more than one display is associated with an input surface, it may be possible to move the window partially off of an individual display so that it straddles plural displays (only a single display shown for clarity). When only a single display is associated with the input surface 80, however, the window cannot be moved off the display.

With the above disclosure in mind, it can now be appreciated that the present invention provides a device that easily can be intuitively understood and alternatingly configured as a graphic tablet and as a touchpad. The particular mode in which the device is configured can be ascertained simply by looking at the display 14, without requiring the user to divert his or her attention away from the display 14 to ascertain the mode or to precisely position his or her finger on the input surface 16. Specifically, in the relative mode, without stimulation of the input surface 16 no window 28 appears, whereas the window 28 always appears in the absolute mode. Alternatively, a window style can be presented in the relative mode that differs from the window style presented in the absolute mode. In any case, the mode is indicated by visual feedback on the display 14.

Moreover, in the absolute (graphic tablet) mode, a 1:1 resolution between the area of the input surface 16 and the area of the graphics window 28 can be maintained, despite the fact that the area of the input surface 16 is smaller than the area of the display 14. This is because the user can take advantage of the device's capability to position the graphics window 28 anywhere on the display 14 in the relative mode and then instantly toggle to the absolute mode, such that a relatively small input surface 16 can provide all the graphics capability most users require without sacrificing resolution.

Still further, the device can be toggled instantly back-and-forth between the two modes, creating a synergistic effect not afforded by previous devices. This toggling between modes is promoted by a consistent visual interface that is clear, predictable, comprehensible, and consistent in operation.

FIGS. 6A and 6B show system 90 that in addition to having an input surface 92 also includes a window motion element, preferably a rate-type pointing device such as a joystick 94 or the pointing device disclosed in my U.S. Pat. No. RE 35,342, incorporated herein by reference. It is to be understood that a window 98 with cursor 96 can be moved across a display 100 by manipulating the joystick 94, as indicated by the arrow 102 in FIG. 6B. In the system 90, the window 98 can be moved by appropriate manipulation of the joystick 94 only when the system 90 is in the absolute mode, and when it is moved by manipulating the joystick 94, the cursor 96 moves with the window 98 and retains its relative position therein. The cursor 96 itself is moved as described previously by manipulating the input surface 92. With this combination, a user can draw on the input surface 92, and when the cursor 96 reaches a boundary of the window 98, the window 98 can be moved by manipulating the joystick 94, thereby facilitating easily inputting a large drawing with a small input surface, without sacrificing resolution. The system 90 shown in FIGS. 6A and 6B is in all other respects identical in configuration and operation to the system 10 shown in FIGS. 1A–1D.

FIGS. 7A and 7B show a system, generally designated 104, that is in all essential respects identical in configuration and operation to the system 90 shown in FIGS. 6A and 6B, with the following exceptions. Instead of being configured as a laptop computer, the system 104 is configured as a graphic tablet having an input surface 106 that is separate from but electrically connected to a display 108. And, instead of a joystick the system 104 incorporates, as a window motion element, a trackball 110 that performs the function (i.e., moving a graphics window 112 when manipulated as indicated by the arrow 114) of the joystick 94 shown in FIGS. 6A and 6B.

Similarly, FIGS. 8A and 8B show a system, generally designated 116, that is in all essential respects identical in configuration and operation to the system 90 shown in FIGS. 6A and 6B, with the following exceptions. Instead of a joystick the system 116 incorporates, as a window motion element, cursor keys 118 that performs the function (i.e., moving a graphics window 120 when manipulated as indicated by the arrow 122) of the joystick 94 shown in FIGS. 6A and 6B.

Additionally, FIGS. 9A and 9B show a system, generally designated 124, that is in all essential respects identical in configuration and operation to the system 90 shown in FIGS. 6A and 6B, with the following exceptions. Instead of being configured as a laptop computer, the system 124 is configured as a graphic tablet having an input surface 126 that is separate from but electrically connected to a display 128. And, instead of a joystick the system 124 incorporates, as a window motion element, a mouse 130 that performs the function (i.e., moving a graphics window 132 when manipulated as indicated by the arrow 134) of the joystick 94 shown in FIGS. 6A and 6B.

Figure 10:
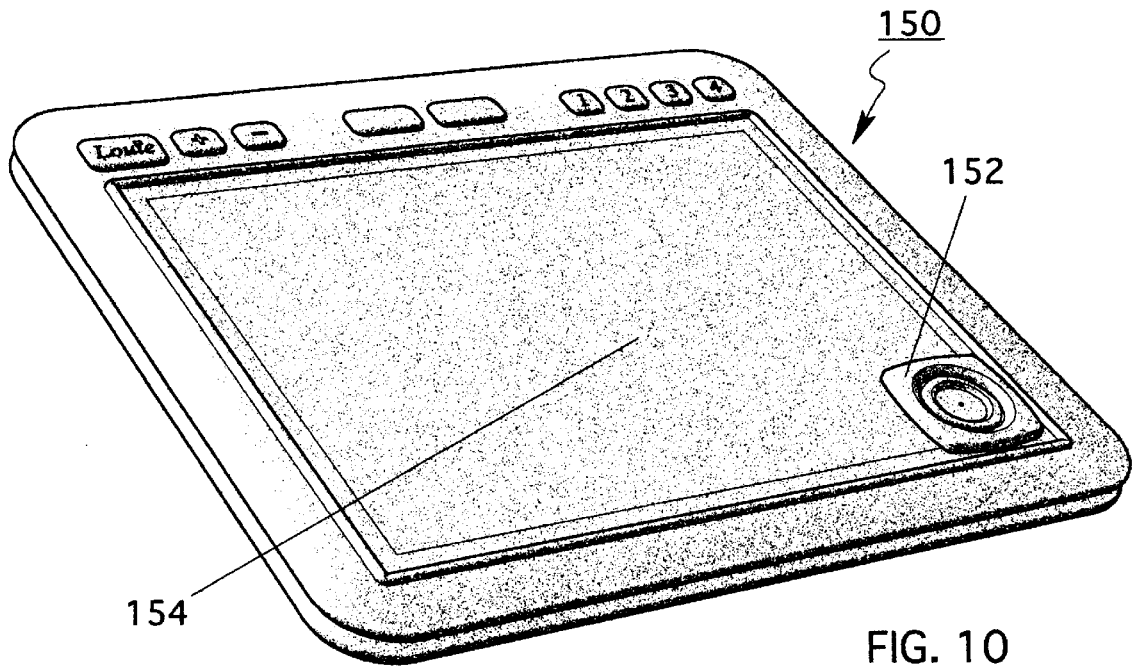
FIG. 10 is a perspective view of an input tablet on which a plastic conversion device has been adhered.
Figure 11:
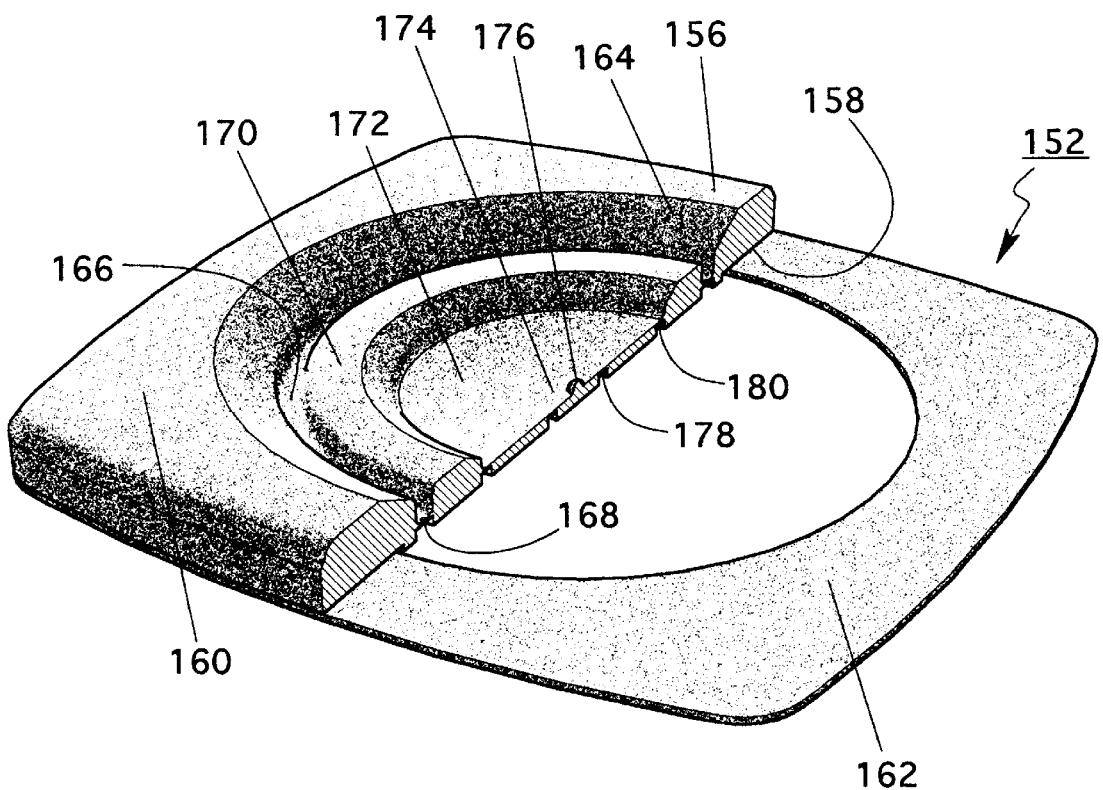
FIG. 11 is a partial cross-sectional perspective view of the device shown in FIG. 10, showing the adhesive layer in its entirety.
Figure 12:
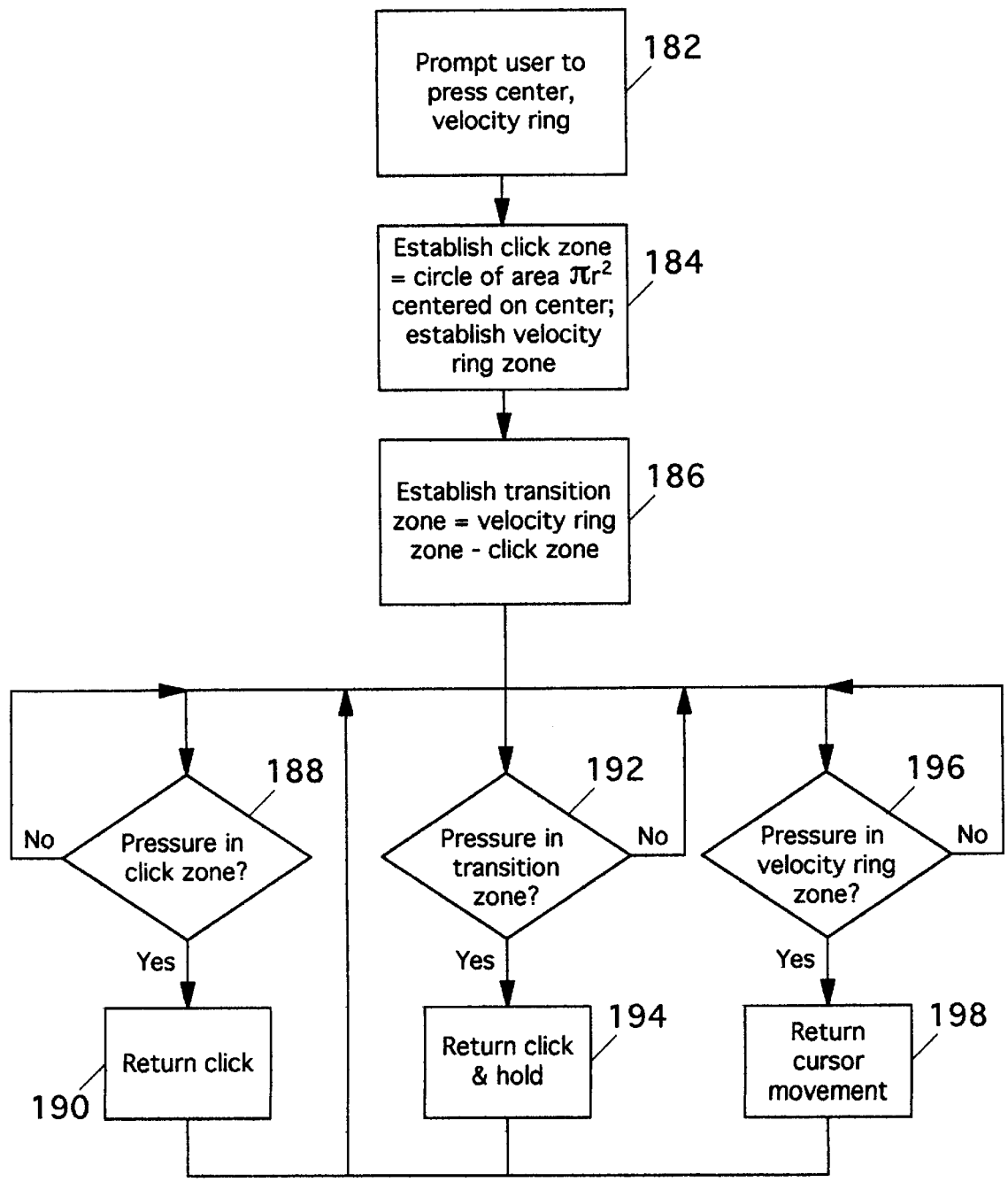
FIG. 12 is a flow chart of the logic used in cooperation with the device shown in FIG. 10.

FIGS. 10–12 show an input system 150 which incorporates a unitary molded plastic body 152 that adheres to a position sensitive input surface 154 to undertake the function of the invention disclosed in our co-pending co-owned U.S. patent application Ser. No. 08/339,807, filed Nov. 14, 1994 for an invention entitled "DEVICE FOR CONTROLLING GRAPHICS OBJECT MOVEMENT USING TRIANGULAR FORCE SENSOR ARRAY", incorporated herein by reference. With the below-disclosed driver software in conjunction with a one-piece stick-on body 152 which includes a three-dimensional, relief-like surface, the system 150 enables a user to locate where to press on the body 152 to effect the particular input functions described in the above-referenced patent application. The user can effect graphics input apart from the body 152 by appropriately pressing against the remainder of the input surface 154 in accordance with principles well-known in the art. Thus, in effect the system 150 converts only that portion of the input surface 154 which is covered by the body 152 into the graphics entry device disclosed in the above-referenced patent application.

FIG. 11 shows the details of the body 152. As shown, the body 152 defines an upper surface 156 and an opposed lower surface 158. The body 152 is generally rectangular and is made from injection-molded plastic, and it includes a thick outer bezel 160. The thickness of the outer bezel 160 is sufficient to render the outer bezel 160 rigid. An adhesive substance 162 is deposited on the lower surface 158 under the outer bezel 160. If desired, a protective paper layer (not shown) can cover the adhesive substance 162 and can be removed when it is desired to adhere the body 152 to the input surface 154.

As shown in FIG. 11, the bezel 160 includes an inner downwardly-sloping circular surface 164 that terminates in a first disc-shaped thin ring 166. A plurality of vent holes 168 are formed through the first thin ring 166 as shown to allow for equalization of pressure inside and outside of the enclosed volume established between the input surface 154 and the body 152. The first thin ring 166 circumscribes a slightly flexible disc-shaped velocity ring 170. As shown, the ring 166 separates the velocity ring 170 from the bezel 160, allowing pressure that is exerted by the user on the velocity ring 170 to be transmitted to the input surface 154, bringing the input surface 154 and the bottom surface of the velocity ring 170 together even when these surfaces are slightly distanced from each other, as can be caused, for example, by manufacturing imperfections.

Like the bezel 160, the velocity ring 170 includes an inner downwardly sloping circular surface, which joins the velocity ring 170 to a disc-shaped ring-like thin (and, hence, flexible) transition zone 172. Concentric within the transition zone 172 is a discshaped thin (and, hence, flexible) click zone 174 that is centered on a central tactile element, such as a raised locating bump 176. Circular grooves 178, 180 are formed in the lower surface 158 to respectively separate the click zone 174 from the transition zone 172 and the transition zone 172 from the velocity ring 170.

As can be appreciated in cross-reference to FIGS. 10 and 11, only the lower surfaces of the click zone 174, transition zone 172, velocity ring 170, and bezel 160 with adhesive 162 rest on the surface of the input surface 154. Accordingly, finger pressure on any one of the click zone 174, transition zone 172, and velocity ring 170 (but not bezel 160) is transmitted to the portions of the input surface 154 that are respectively in contact with the click zone 174, transition zone 172, and velocity ring 170.

It may now be appreciated that by disposing the adhesive 162 only under the relatively thick, rigid bezel 160 and not under any of the input portions (170, 172, 174) of the body 152, no adhesive-originated air bubbles are trapped underneath the input portions. Such air bubbles could deleteriously affect the operation of the system 150. Moreover, the flexibility of the input portions (170, 172, 174) and the even more flexible grooves 178, 180 and the first thin ring 166 permits some flexing and, hence, accommodation of slight surface mismatches between the body 152 and the input surface 154.

FIG. 12 shows the logic of the device driver that is associated with the system 150. Starting at block 182, the user is prompted to press the center locating bump 176 and, in several locations, the velocity ring 170. These calibrating actions by the user are sensed by the portions of the input surface 154 that are directly beneath the bump 176 and velocity ring 170, which in response generate calibrating signals.

In response to the calibrating signals, at block 184 the logic defines a click zone on the input surface 154 to be a circle having its center at the locating bump 176 and having a radius of "r", wherein "r" is the distance from the locating bump 176 to the groove 178. Also at block 184, a velocity ring on the input surface 154 is established to correspond to the velocity ring 170 of the body 152, based on the signals received therefrom at block 182. Moving to block 186, the logic defines a transition zone on the input surface 154 to be the area between the click zone and velocity ring.

Accordingly, block 182–186 "set up" an area of the input surface 154 to be analogous to the sensing areas disclosed in the above-referenced U.S. patent application. In this way, future pressure on any one of the velocity ring 170, transition zone 172, or click zone 174 of the body 152 is correlated to predetermined input commands.

These commands can be further understood in reference to decision diamonds 188, 192, and 196. At decision diamond 188, input from the click zone 174 is awaited, and when received, a "click" signal is returned at block 190. This click signal is analogous to a conventional click signal generated by a mouse.

In contrast, at decision diamond 192, input from the transition zone 172 is awaited, and when received, a click and hold is returned at block 194. By "click and hold" is meant the well-known mouse function of clicking on a graphics object and holding the click while the object is dragged across a display. On the other hand, at decision diamond 196, input from the velocity zone 174 is awaited, and when received, a signal representative of cursor movement is returned at block 198. In returning this signal, it is to be understood that the system 150 preferably uses the motion sensing logic of the above-referenced U.S. patent application. While the preferred embodiment advantageously uses a body 152 as a tactile aid in locating the various zones, because the zones are defined in software it is possible to execute the logic herein without using a tactile body.

Figure 13:
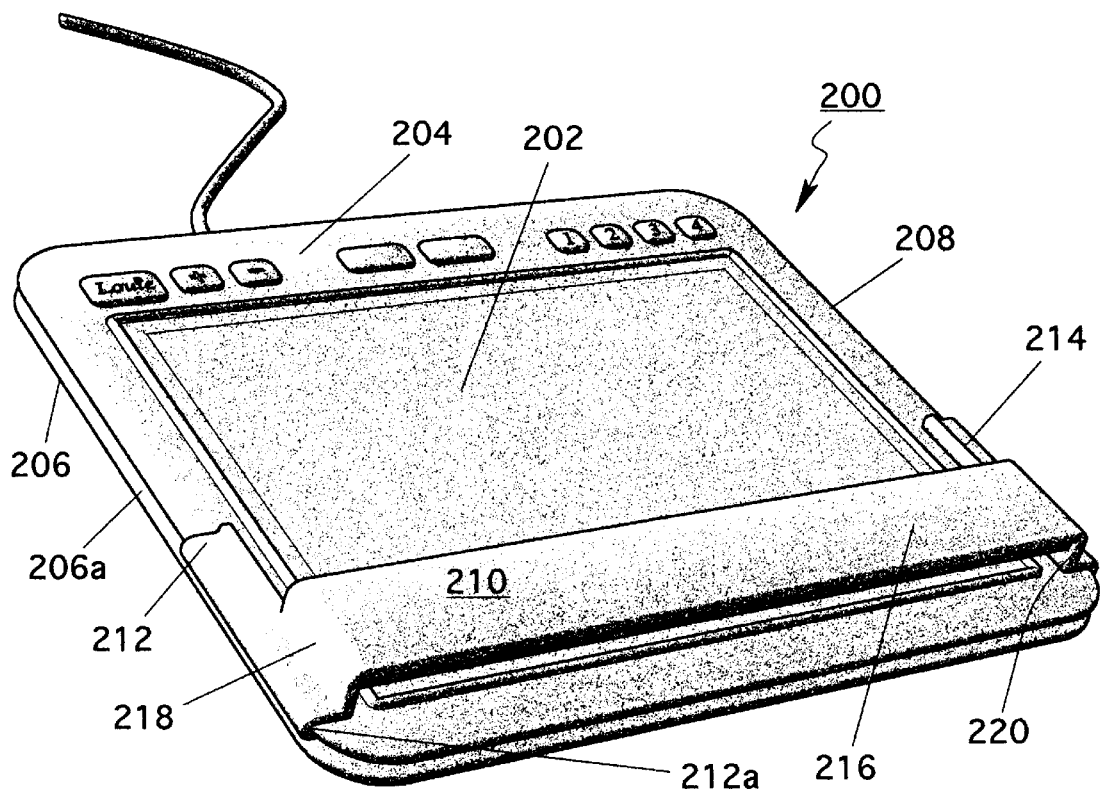
FIG. 13 is a perspective view of an input device with armrest bridge slidably engaged therewith.

FIG. 13 shows a device generally designated 200 that includes a graphics input substrate 202 and a frame 204 surrounding and holding the substrate 202. The substrate 202 with frame 204 can be one of the graphic tablets shown and described above.

As shown, the frame 204 defines opposed identically-configured side edges 206, 208. A bridge 210 is slidably engaged with the frame 204 along the side edges 206, 208, with the bridge 210 being spaced from the substrate 202 such that a person can rest a portion of his or her hand or wrist on the bridge 210 while inputting tactile signals on the substrate 202.

In the preferred embodiment, the bridge 210 includes symmetrical and opposed engagement members 212, 214 that are respectively slidably engaged with the opposed side edges 206, 208. More specifically, each edge 206, 208 is formed with a respective elongated groove (only the groove 206a shown in FIG. 13) and each engagement member 212, 214 is U-shaped, with a respective lower arm (only the arm 212a shown in FIG. 13) of each member 212, 214 being received in a respective groove.

A wristrest segment 216 of the bridge 210 extends between the engagement members 212, 214 as shown, and as also shown the wristrest segment 216 is laterally offset from the members 212, 214 and, thus, spaced from the input surface 202. To effect this offset, the wristrest segment 216 is joined to the engagement members 212, 214 by joining segments 218, 220, each of which is oriented generally perpendicularly to the wristrest segment 216 as shown. With this cooperation of structure, the bridge 210 can be moved relative to the input surface 202 to a desired location, and then a user can rest his or her wrist on the wristrest segment 216 while drawing on the input surface 202, without generating undesired spurious input signals as might otherwise occur were the user's wrist to contact the input surface 202.

While the particular INTEGRATED POINTING AND DRAWING GRAPHICS SYSTEM FOR COMPUTERS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

What is claimed is:

1. A computer program product comprising:
    a computer program storage device readable by a digital processing system; and
    logic means on the program storage device and including instructions executable by the digital processing system for performing method steps for controlling a cursor on a display associated with the digital processing system based on signals received from
    a position sensitive input surface, the method steps comprising:
        receiving calibration signals from the input surface;
        in response to the calibration signals, defining at least a click zone and a velocity zone; and
        in response to subsequent signals from the click zone and the velocity zone, respectively returning click signals and cursor motion signals.

2. The computer program product of claim 1, wherein the method steps further comprise:
    defining a transition zone in response to the calibration signals; and
    in response to subsequent signals from the transition zone, returning click and hold signals.

3. The computer program product of claim 2, in combination with a device comprising:
    a unitary flexible plastic body defining a central tactile element, a velocity ring element centered on the tactile element, and a transition plate between the tactile element and the velocity ring element, wherein the central tactile element, transition plate, and velocity ring element respectively correspond to the click zone, transition zone, and velocity ring, the body including an adhesive surface for adhering the body to the position sensitive input surface.

4. The combination of claim 3, wherein the device further comprises:
    a bezel surrounding the velocity ring;
    an annular sloped surface extending from the bezel toward the velocity ring; and
    a circular groove separating the sloped surface from the velocity ring.

5. The combination of claim 4, wherein the bezel establishes the adhesive surface, and the device further comprises at least one vent hole formed in the circular groove.

6. A device, comprising:
    a unitary flexible plastic body defining a central tactile element, a velocity ring element centered on the tactile element, and a transition plate between the tactile element and the velocity ring element, wherein the central tactile element, transition plate, and velocity ring element respectively correspond to a click zone, a transition zone, and a velocity ring, the body including an adhesive surface for adhering the body to a position sensitive input surface.

7. The device of claim 6, wherein the device further comprises:
    a bezel surrounding the velocity ring;
    an annular sloped surface extending from the bezel toward the velocity ring; and
    a circular groove separating the sloped surface from the velocity ring.

8. The device of claim 7, wherein the bezel establishes the adhesive surface, and the device further comprises at least one vent hole formed in the circular groove.

* * * * *